(12) United States Patent
Tran et al.

(10) Patent No.: US 12,724,667 B1
(45) Date of Patent: Sep. 1, 2026

(54) MEMORY CONTROL COMPONENT WITH SPLIT AUXILIARY CHANNEL

(71) Applicant: Astera Labs, Inc., Santa Clara, CA (US)

(72) Inventors: Anh T. Tran, San Diego, CA (US); Dhairya Bapodra, San Jose, CA (US); Nirav Ishwarbhai Patel, Fremont, CA (US)

(73) Assignee: Astera Labs, Inc., San Jose, CA (US)

( * ) Notice: Subject to any disclaimer, the term of this patent is extended or adjusted under 35 U.S.C. 154(b) by 20 days.

(21) Appl. No.: 18/913,264

(22) Filed: Oct. 11, 2024

Related U.S. Application Data

(63) Continuation of application No. 17/976,994, filed on Oct. 31, 2022, now Pat. No. 12,141,027.

(51) Int. Cl.
*G06F 11/10* (2006.01)

(52) U.S. Cl.
CPC ................................ *G06F 11/1004* (2013.01)

(58) Field of Classification Search
CPC .................................................. G06F 11/1004
USPC ......................................................... 714/763
See application file for complete search history.

(56) References Cited

U.S. PATENT DOCUMENTS 9,548,108 B2 1/2017 Yu et al.
2013/0007562 A1 * 1/2013 Fai ...................... G06F 11/1004 710/305
2013/0117625 A1 5/2013 Jakka et al.
2015/0199149 A1 * 7/2015 Sankaranarayanan ....................... G06F 3/0679 711/102
2016/0070336 A1 3/2016 Kojima et al.
2019/0288710 A1 9/2019 Bhatia et al.
2019/0317898 A1 * 10/2019 Gupta ................ G06F 11/1076
2021/0141692 A1 5/2021 Agarwal et al.
2024/0143437 A1 * 5/2024 Tran ................... G06F 11/1004

FOREIGN PATENT DOCUMENTS

CN 114625762 A * 6/2022 ....... G06F 16/24552
CN 110780810 B * 6/2023 ......... G06F 12/0253

OTHER PUBLICATIONS

PCT International Search Report and Written Opinion of International Search Authority (European Patent Office) in International Application No. PCT/US2023/035867, dated Mar. 22, 2024, 19 pages.
World Intellectual Property Organization (WIPO), Invitation to Pay Additional Fees/Partial International Search Result/Provisional Opinion of International Search Authority (European Patent Office) in International Application No. PCT/US2023/035867, dated Jan. 29, 2024, 11 pages.

* cited by examiner

*Primary Examiner* — Albert Decady
*Assistant Examiner* — Enam Ahmed
(74) *Attorney, Agent, or Firm* — Charles Shemwell

(57) ABSTRACT

A memory control component allocates a portion of an auxiliary signaling channel and corresponding memory storage, conventionally dedicated to error correction code (ECC) conveyance and storage, for conveyance of metadata and/or other types of component-level information—splitting the auxiliary channel between metadata and ECC conveyance/storage in proportions that obviate conventional metadata conveyance/storage via the primary data channel and thus maintaining full primary channel bandwidth/storage-capacity for user data.

14 Claims, 7 Drawing Sheets

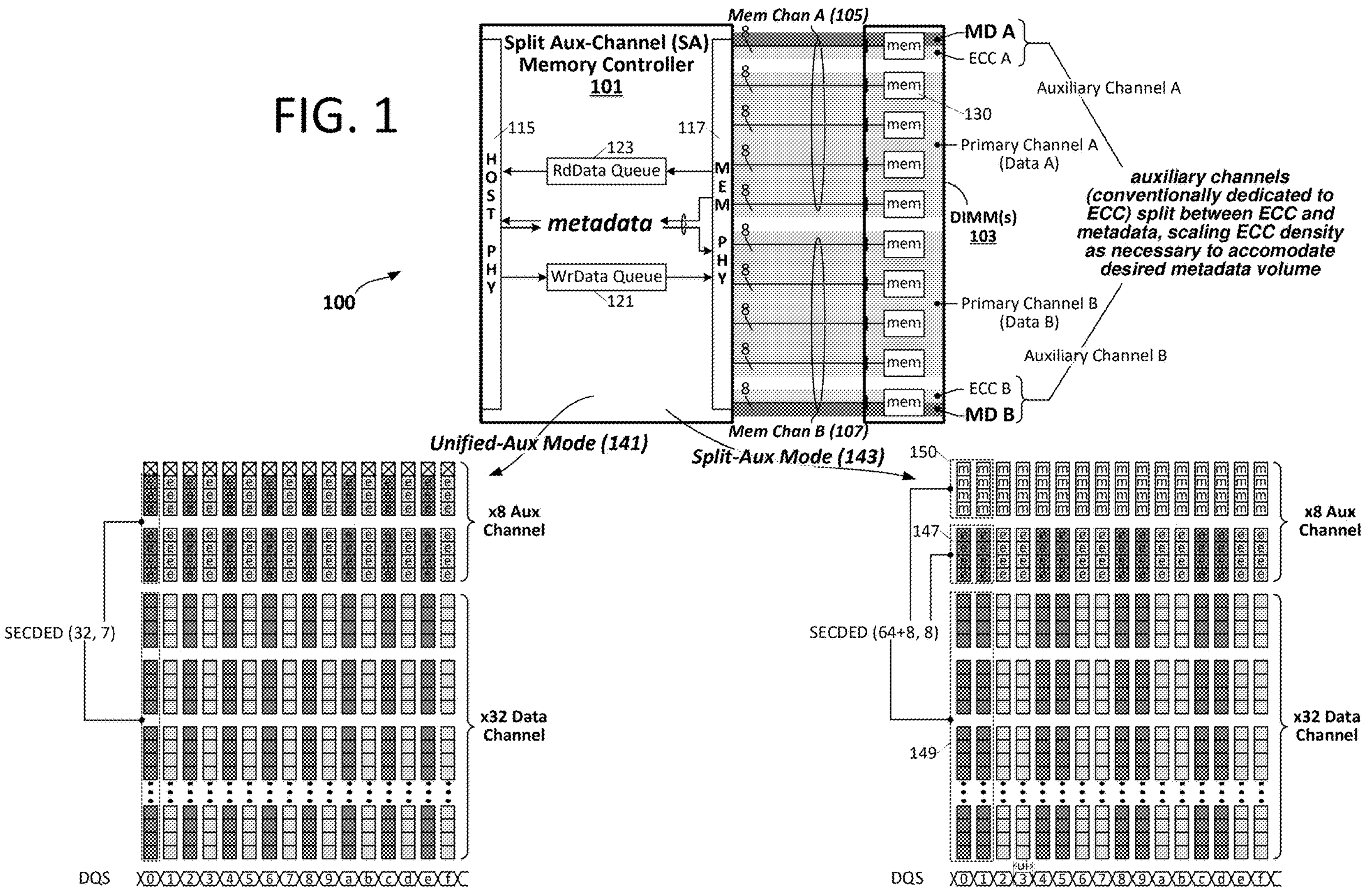
FIG. 1
100
Split Aux-Channel (SA) Memory Controller 101
115
117
HOST PHY
123
RdData Queue
metadata
WrData Queue
121
MEM PHY
Mem Chan A (105)
Mem Chan B (107)
mem
MD A
ECC A
Auxiliary Channel A
130
Primary Channel A (Data A)
DIMM(s) 103
auxiliary channels (conventionally dedicated to ECC) split between ECC and metadata, scaling ECC density as necessary to accomodate desired metadata volume
Primary Channel B (Data B)
Auxiliary Channel B
ECC B
MD B
Unified-Aux Mode (141)
Split-Aux Mode (143)
x8 Aux Channel
x32 Data Channel
SECDED (32, 7)
DQS
150
147
SECDED (64+8, 8)
149

Memory-Side PHY
Unified-Aux Mode 161
Split-Aux Mode 183 (scaled ECC density)
Host RdData 64B
Host WrData 64B
x32
512
16:1 des
177
1:16 ser
163
32
RdDat
WrDat
config
ECC Dec SECDED (32, 7)
175
ECC Enc SECDED (32, 7)
165
ECC 7
RdDat'
170
172
167
tclk
unused
ECC6
ECC5
ECC4
ECC3
ECC2
ECC1
ECC0
DQ31
DQ30
DQ03
DQ02
DQ01
DQ00
Metadata (Rd)
Metadata (Wr)
64
8:1 des
209
211
1:8 Ser
191
1:8 ser
185
ECC Dec SECDED (72, 8)
207
ECC Enc SECDED (72, 8)
189
2:1 des
205
203
201
MD'
ECC
RdD'
1:2 ser
193
195
187
MD 4
ECC 4
WrD
MD3
MD2
MD1
MD0

FIG. 3

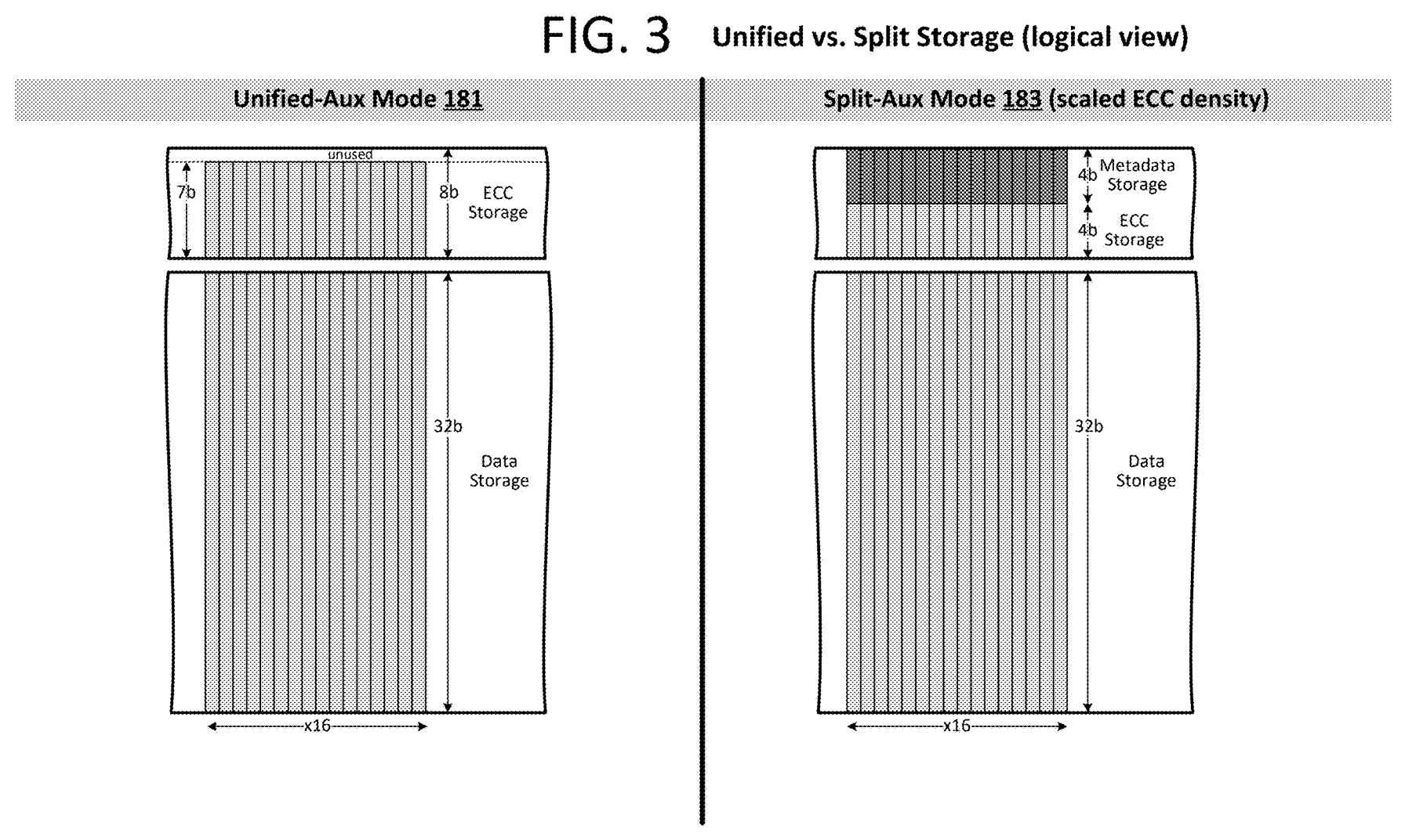

Unified vs. Split Storage (logical view)

Unified-Aux Mode 181 unused
7b
8b
ECC Storage
32b
Data Storage
x16

Split-Aux Mode 183 (scaled ECC density)

4b
Metadata Storage
4b
ECC Storage
32b
Data Storage
x16

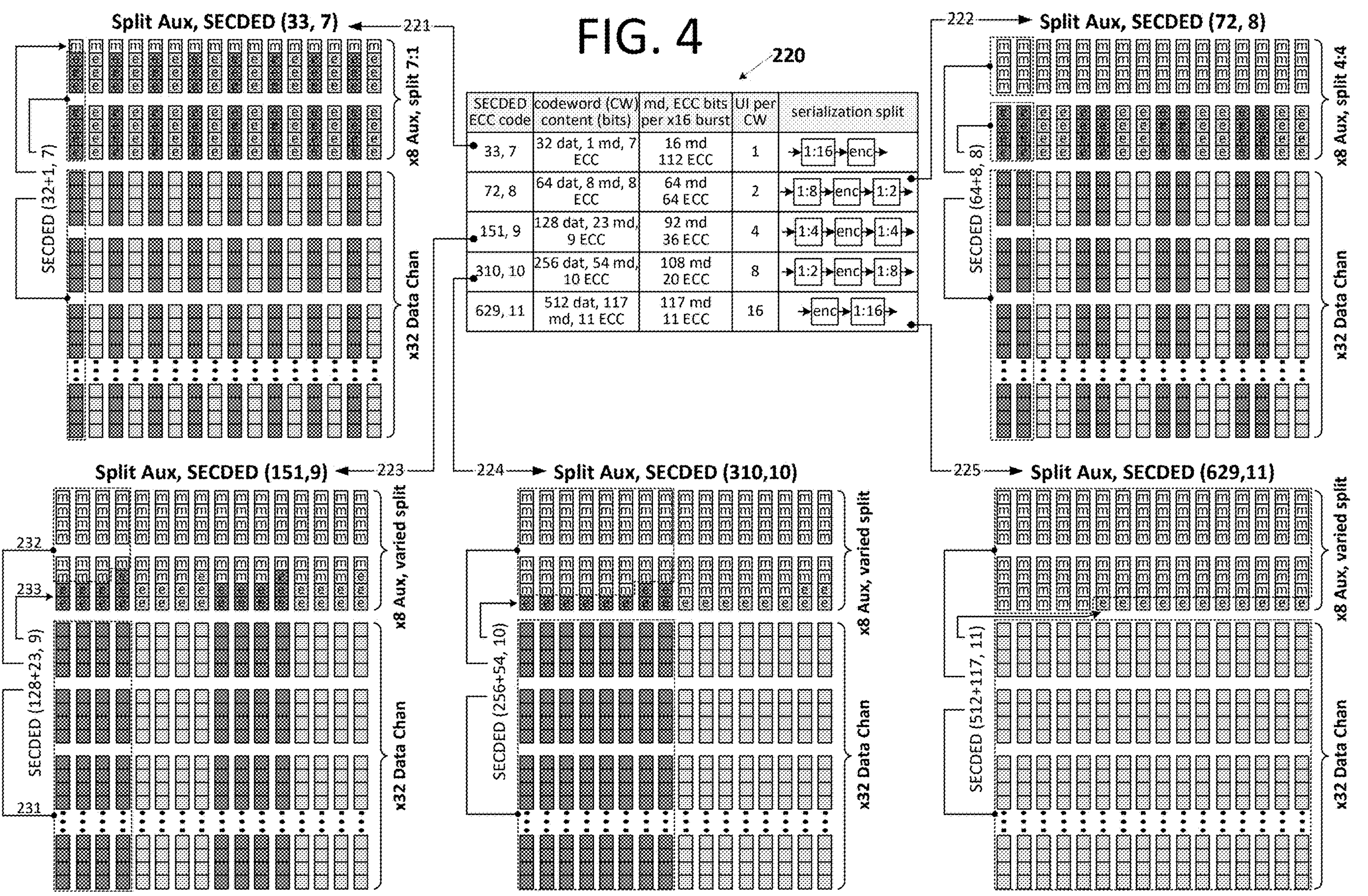
FIG. 4
220
SECDED ECC code
codeword (CW) content (bits)
md, ECC bits per x16 burst
UI per CW
serialization split
33, 7
32 dat, 1 md, 7 ECC
16 md 112 ECC
1
1:16
enc
72, 8
64 dat, 8 md, 8 ECC
64 md 64 ECC
2
1:8
enc
1:2
151, 9
128 dat, 23 md, 9 ECC
92 md 36 ECC
4
1:4
enc
1:4
310, 10
256 dat, 54 md, 10 ECC
108 md 20 ECC
8
1:2
enc
1:8
629, 11
512 dat, 117 md, 11 ECC
117 md 11 ECC
16
enc
1:16
Split Aux, SECDED (33, 7)
221
x8 Aux, split 7:1
x32 Data Chan
SECDED (32+1, 7)
Split Aux, SECDED (72, 8)
222
x8 Aux, split 4:4
x32 Data Chan
SECDED (64+8, 8)
Split Aux, SECDED (151,9)
223
x8 Aux, varied split
x32 Data Chan
SECDED (128+23, 9)
232
233
231
Split Aux, SECDED (310,10)
224
x8 Aux, varied split
x32 Data Chan
SECDED (256+54, 10)
Split Aux, SECDED (629,11)
225
x8 Aux, varied split
x32 Data Chan
SECDED (512+117, 11)

SECDED ECC code
codeword (CW) content (bits)
33, 7
32 dat, 1 md, 7 ECC
72, 8
64 dat, 8 md, 8 ECC
151, 9
128 dat, 23 md, 9 ECC
310, 10
256 dat, 54 md, 10 ECC
629, 11
512 dat, 117 md, 11 ECC
250
40 bit
40 bit
40 bit
40 bit
251
253

36 bit
36 bit
261
270
SECDED ECC code
codeword (CW) content (bits)
md, ECC bits per x16 burst
UI per CW
serialization split
135, 9
128 dat, 7 md, 9 ECC
28 md 36 ECC
4
1:4 enc 1:4
278, 10
256 dat, 22 md, 10 ECC
44 md 20 ECC
8
1:2 enc 1:8
565, 11
512 dat, 53 md, 11 ECC
53 md 11 ECC
16
enc 1:16
Split Aux, SECDED (135,9)
271
Split Aux, SECDED (278,10)
272
273
Split Aux, SECDED (565,11)
SECDED (128+7, 9)
SECDED (256+22, 10)
SECDED (512+53, 11)
x4 Aux
x32 Data Chan FIG. 7 ECC Enc/Dec in Half-Rate Core FIG. 8 ECC Enc/Dec in Quarter-Rate Core

FIG. 9 Core-Domain Enc/Dec -- ECC/SERDES Options (Non-exhaustive examples)

| | clock ratio mem:core | mem chan size: DQ\|ECC | SECDED ECC Code | max MD bits per x16 burst | UI per core clk cycle | UI per codeword | enc/dec per core clk cycle | Qty ECC enc/dec blocks | host-side serdes ratio | mem-side serdes ratio |
|---|---|---|---|---|---|---|---|---|---|---|
| Half-Rate Core Clock | 2:1 | 40b (32\|8) | 33, 7 | 16 | 4 | 1 | 4 | 4 | 4 | 4 |
| | 2:1 | 40b (32\|8) | 72, 8 | 64 | 4 | 2 | 2 | 2 | 4 | 4 |
| | 2:1 | 40b (32\|8) | 151, 9 | 92 | 4 | 4 | 1 | 1 | 4 | 4 |
| | 2:1 | 40b (32\|8) | 310, 10 | 108 | 4 | 8 | 1/2 | 1 | 2 | 8 |
| | 2:1 | 40b (32\|8) | 629, 11 | 117 | 4 | 16 | 1/4 | 1 | -- | 16 |
| | 2:1 | 36b (32\|4) | 135, 9 | 28 | 4 | 4 | 1 | 1 | 4 | 4 |
| | 2:1 | 36b (32\|4) | 278, 10 | 44 | 4 | 8 | 1/2 | 1 | 2 | 8 |
| | 2:1 | 36b (32\|4) | 565, 11 | 53 | 4 | 16 | 1/4 | 1 | -- | 16 |
| Quarter-Rate Core Clock | 4:1 | 40b (32\|8) | 33, 7 | 16 | 8 | 1 | 8 | 8 | 8 | 2 |
| | 4:1 | 40b (32\|8) | 72, 8 | 64 | 8 | 2 | 4 | 4 | 4 | 4 |
| | 4:1 | 40b (32\|8) | 151, 9 | 92 | 8 | 4 | 2 | 2 | 2 | 8 |
| | 4:1 | 40b (32\|8) | 310, 10 | 108 | 8 | 8 | 1 | 1 | 2 | 8 |
| | 4:1 | 40b (32\|8) | 629, 11 | 117 | 8 | 16 | 1/2 | 1 | -- | 16 |
| | 4:1 | 36b (32\|4) | 135, 9 | 28 | 8 | 4 | 2 | 2 | 2 | 8 |
| | 4:1 | 36b (32\|4) | 278, 10 | 44 | 8 | 8 | 1 | 1 | 2 | 8 |
| | 4:1 | 36b (32\|4) | 565, 11 | 53 | 8 | 16 | 1/2 | 1 | -- | 16 |

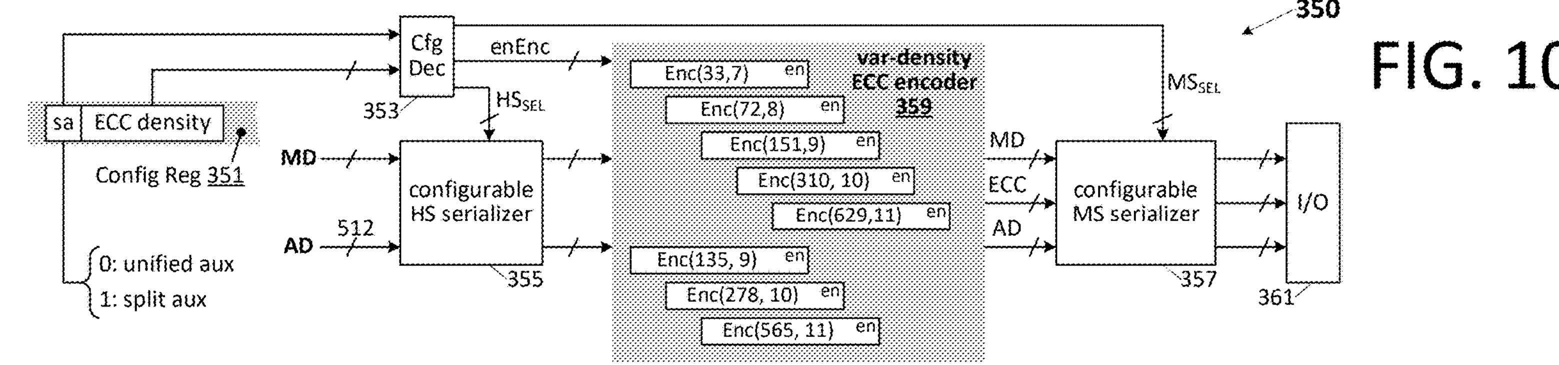

FIG. 10

MEMORY CONTROL COMPONENT WITH SPLIT AUXILIARY CHANNEL

CROSS REFERENCE TO RELATED APPLICATIONS

This application is a continuation of and hereby incorporates by reference U.S. application Ser. No. 17/976,994 filed Oct. 31, 2022 (U.S. Pat. No. 12,141,027).

DRAWINGS

The various embodiments disclosed herein are illustrated by way of example, and not by way of limitation, in the figures of the accompanying drawings and in which like reference numerals refer to similar elements and in which:

FIG. 1 illustrates an embodiment of a memory system having a split-auxiliary-channel memory control component coupled via A and B memory channels to a memory subsystem constituted by one or more dual-channel DIMMs (dual inline memory modules);

Figure 2:
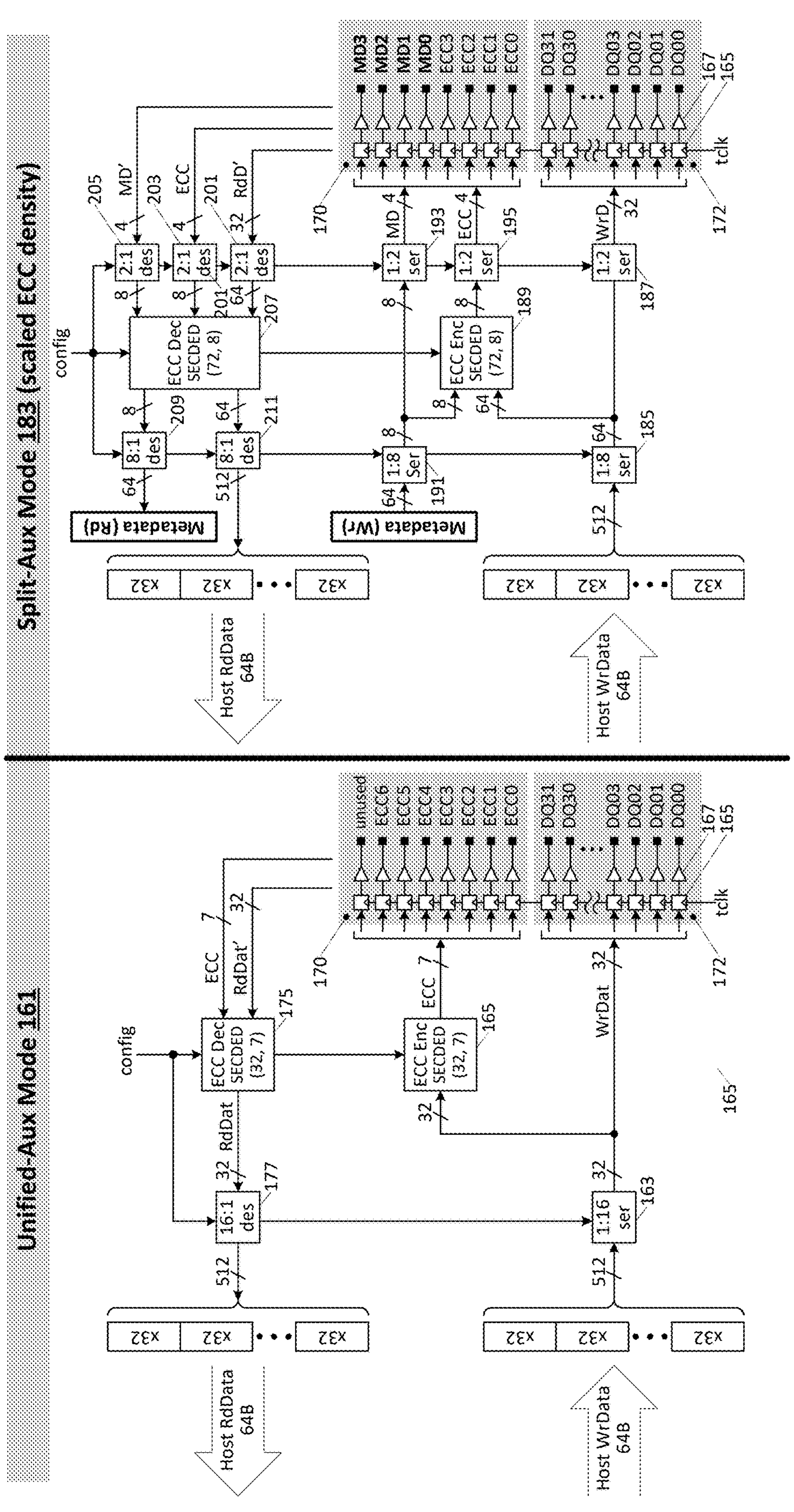
FIG. 2 illustrates exemplary serializer/deserializer and error correction code (ECC) encoder/decoder circuitry within a mode-configurable memory-side physical signaling interface (PHY)
Figures 5, 6:
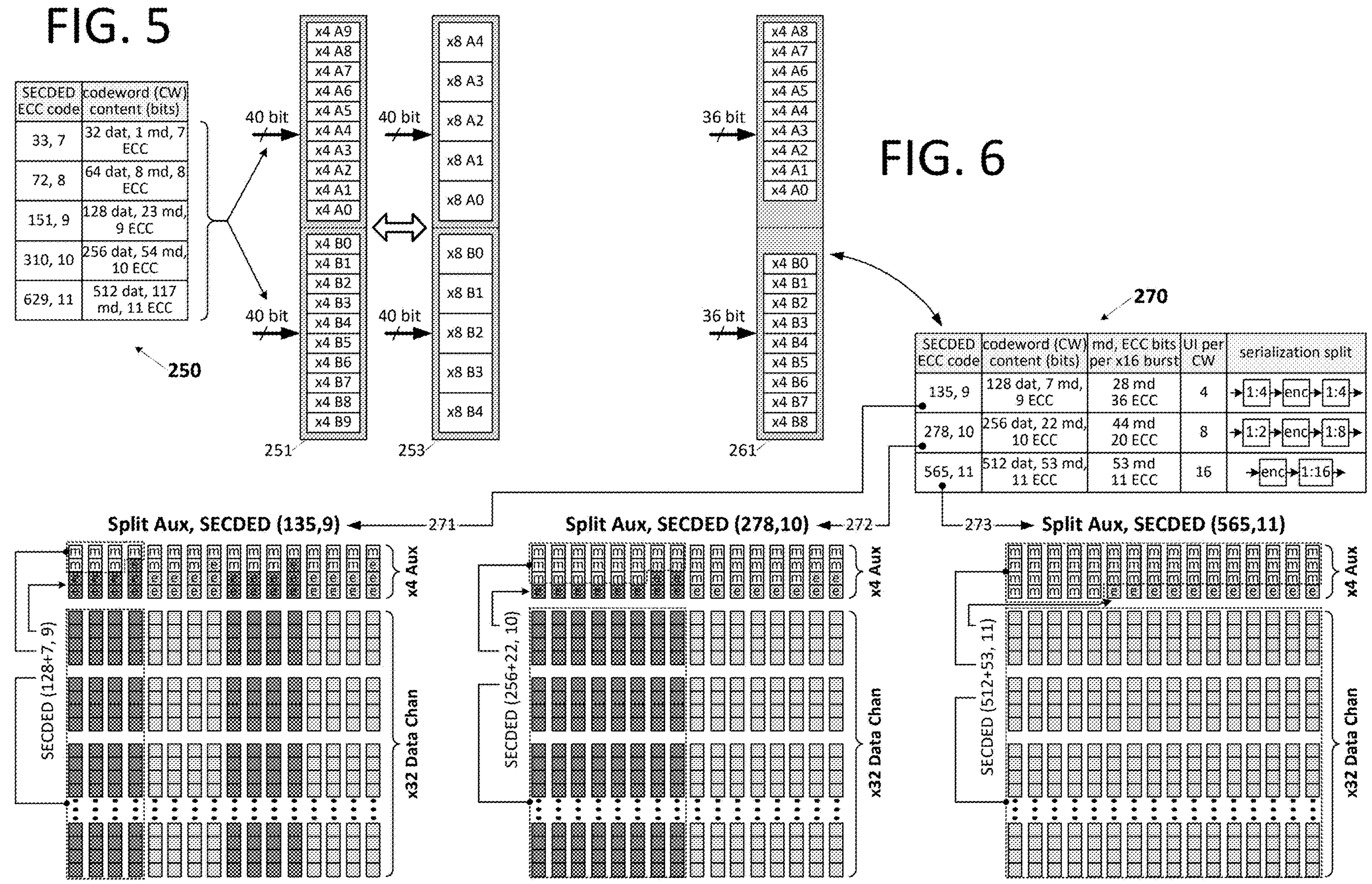

FIG. 3 presents a conceptual view of application, metadata and ECC storage according to the unified- and split-auxiliary operating modes shown in FIG. 2, showing exclusively ECC storage within the auxiliary partition in a unified-auxiliary mode, and an evenly split allocation of that same storage in split-auxiliary mode, half of the auxiliary storage to metadata and the other half to ECC;

FIG. 4 illustrates various configurable (or fixed-by-hardware) ECC-density options that may be implemented by the split-auxiliary control component of FIGS. 1 and 2;

FIG. 5 illustrates applicability of the various ECC bit depths shown within the FIG. 4 table across different multi-channel DIMM implementations;

FIG. 6 illustrates exemplary application of a split-auxiliary channel in an alternative DIMM implementation having two 36-bit memory channels;

Figures 7, 8:
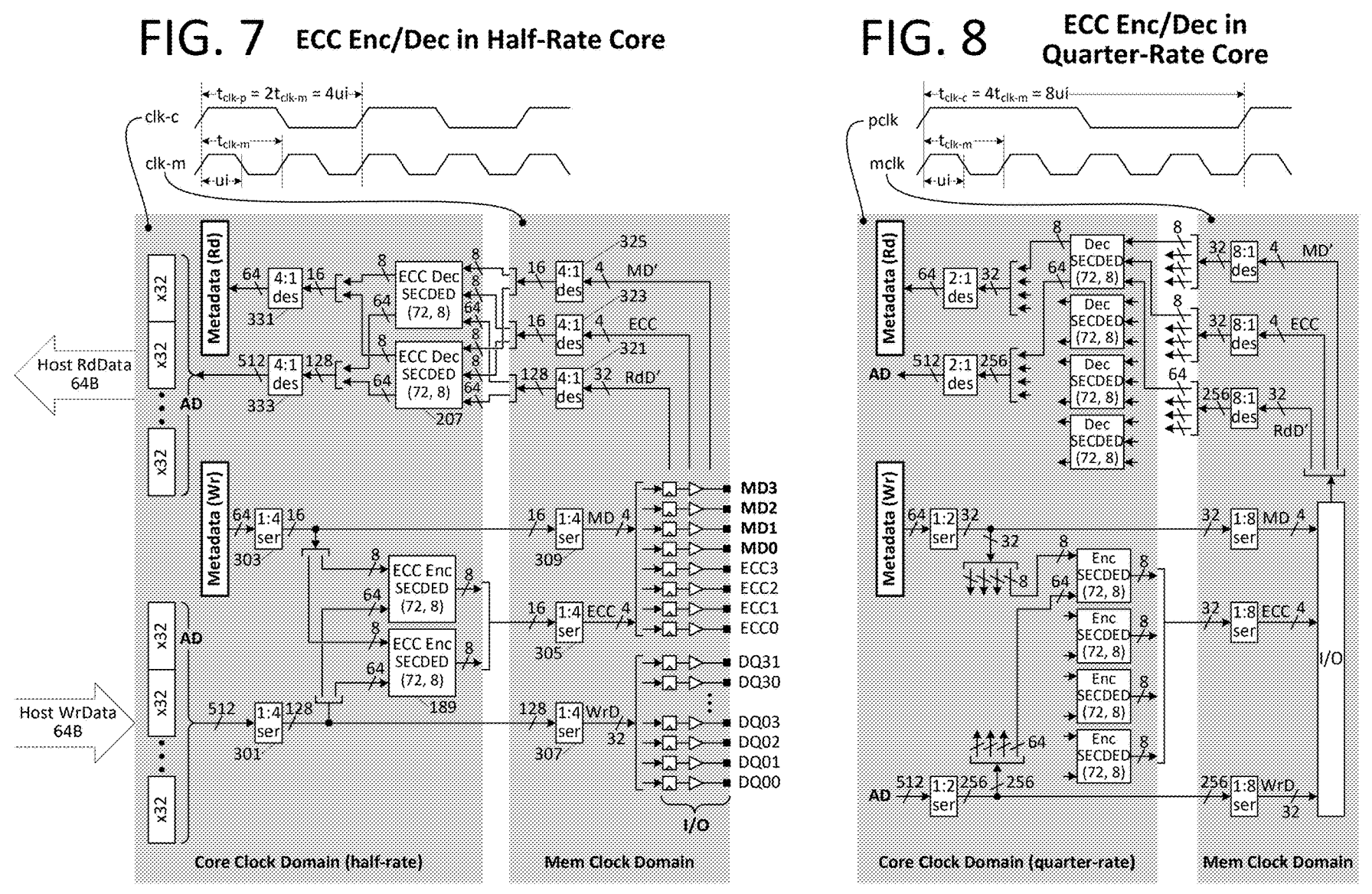

FIGS. 7 and 8 illustrate examples of ECC circuit parallelization for the two-unit-interval per ECC codeword example shown in row 2 of the FIG. 4 table row two, with parallel (multi-instance) ECC encoders/decoders clocked by half-rate core clock and quarter-rate core clocks, respectively;

FIG. 9 presents a tabulated view of various configuration operations that may be selected/enabled to yield half-rate core clock and quarter-rate core clock ECC encoding/decoding for selected ECC bit depths and across the exemplary module memory populations depicted in FIGS. 1, 5 and 6; and FIG. 10 illustrates an embodiment of a memory control component having a configuration register that may be run-time and/or production-time programmed to enable operation in either of the unified-auxiliary or split-auxiliary modes presented herein and, when split-aux mode is enabled, to operate with an ECC density that yields a desired metadata subchannel bandwidth/storage capacity within an otherwise ECC-dedicated auxiliary channel.

DETAILED DESCRIPTION

In various embodiments herein a memory control component allocates a portion of an auxiliary signaling channel and corresponding memory storage, conventionally dedicated to error correction code (ECC) conveyance and storage, for conveyance of metadata and/or other types of component-level information—splitting the auxiliary channel between metadata (or other information) and ECC conveyance/storage in proportions that obviate conventional metadata conveyance/storage via the primary data channel and thus maintaining full primary channel bandwidth/storage-capacity for user data.

In a number of embodiments ECC density (volume of ECC information per memory access transaction) is scaled as necessary to accommodate a desired metadata volume—for example, exploiting non-linearity between ECC bit-depth and volume of ECC-protected data to exponentially expand the protected data volume at the cost of one or more additional ECC bits, reducing the total ECC content conveyed per memory access transaction and thus freeing bandwidth within the otherwise ECC-dedicated auxiliary channel for conveyance of metadata. Where user data or other host-level processing data ("application data") for a given memory access is conveyed between the control component and memory subsystem in serialized transfers (i.e., a data burst having a length according to the number of serialized transfers), ECC density scaling may be effected by extending a single ECC value to protect data content within an extended number of serialized transfers (e.g., instead of ECC value per individual transfer, incrementally larger ECC value to protect collective data within 2, 4, 8, 16, etc. transfers), configuring data serializing/deserializing circuitry within a physical signaling interface (PHY) as necessary to effect the extended ECC protection. Additionally, the metadata conveyed per memory access may be constrained to yield a collective data volume (i.e., total of the metadata and host-level application data) within the protection size of the scaled ECC value, thus enabling both the application data and metadata to be ECC-protected. In other embodiments, the partitioning of a given memory channel between auxiliary channel and application data channel (primary data channel) may vary, with ECC density scaling likewise adjusted to enable conveyance of desired metadata volume. Also, in all embodiments, ECC encoding/decoding may be executed in a reduced-frequency clock domain—for example, a core clock domain of the memory control component that cycles at half, one-quarter, etc. of PHY clock(s) used to time data transmission/reception over controller-to-memory signaling links—with ECC encoding/decoding circuitry and serialization/deserialization circuitry configured accordingly (e.g., programmatically or by design). These and other features and embodiments are described in further detail below.

FIG. 1 illustrates an embodiment of a memory system 100 having a split-auxiliary-channel memory control component 101 coupled via A and B memory channels to a memory subsystem constituted by one or more dual-channel DIMMs 103. As shown, each of the memory channels (105, 107) is partitioned into a primary "application data" channel and an auxiliary channel with the latter split (in at least one operating mode of the control component) between ECC and metadata subchannels—an out-of-band approach that enables metadata conveyance and storage (e.g., within an auxiliary partition of the memory subsystem) without compromising primary-channel bandwidth or storage capacity as required in conventional in-band systems (i.e., metadata conveyed via primary channel and stored within application data space—degrading both application data bandwidth and storage capacity).

In the depicted example, memory control component 101 ("control component," "memory controller" or "controller")

includes counterpart physical signaling interfaces 115 and 117 to a host component (e.g., processor, application specific circuit, neural engine, etc., not shown) and a memory subsystem that includes one or more DIMMs 103—host-side PHY and memory-side PHY, respectively. In a data-write transaction, the memory control component receives application data and associated metadata via host-side PHY 115 (together with a corresponding memory write instruction/command), queuing the write data (121) and optionally the metadata for eventual output to the memory subsystem via memory-side PHY 117. When operated in a split-auxiliary mode (i.e., splitting the auxiliary channel into metadata and ECC sub-channels), control component 101 generates a predetermined amount of ECC information (predetermined number of ECC values with predetermined bit depth) per memory access transaction according to volume of metadata to be conveyed/stored as part of that same transaction, thus freeing a portion of the auxiliary channel bandwidth and storage capacity for metadata storage. In the case of single-error-correction, double-error-detection (SECDED) ECC encoding/decoding, for example, the control component may apply a predetermined (pre-designed, host-instructed, programmatically-selected, etc.) SECDED encoder/decoder hardware set to generate an ECC volume sized in complement with the per-transaction metadata volume such that:

- the auxiliary sub-channel (within either of the A and B memory channels) bandwidth and storage capacity is split according to the ECC/metadata ratio, enabling metadata conveyance and storage exclusively via the auxiliary sub-channel partition (i.e., no primary channel bandwidth or storage capacity consumed).
- the ECC codeword (ECC-protected data and ECC value, collectively) is sufficiently large to encompass both the application data and associated metadata, meaning that both application data and metadata are subject to ECC protection (i.e., errors detected and, if possible, corrected in both metadata and application data).

Still referring to FIG. 1, each of the A and B memory channels includes multiple sets of 'N' signaling links (N=8 in this example) coupled to respective DIMM-mounted memory components 130 (e.g., each set of N signaling links coupled directly or via an data buffer component (unshown) to a pair of integrated-circuit memory components 130 disposed on opposite faces of the DIMM), with a predominant share of the signaling links and corresponding memory components allocated to conveyance of application data (primary channel), and a relatively smaller share of the signaling links and memory components allocated to the auxiliary channel. When operated in an optional unified-auxiliary mode, memory controller 101 dedicates the auxiliary channel (i.e., auxiliary sets of signaling links and memory component(s) 130 coupled thereto) exclusively to ECC conveyance and storage. In split-auxiliary mode, by contrast, the memory controller splits the auxiliary channel into ECC and metadata subchannels as discussed above, scaling the ECC density (amount of ECC information per memory transaction) as necessary to enable all metadata (and/or other component-level information) associated with per-transaction application data to be conveyed over the auxiliary channel, thus effecting metadata conveyance and storage without degrading application data signaling bandwidth or storage allocation.

Exemplary detail views 141 and 143 (FIG. 1) contrast control-component data transmissions in unified-auxiliary and split-auxiliary operating modes. As shown, the auxiliary channel is dedicated to ECC transmission in unified auxiliary mode, conveying a 7-bit SECDED ECC value with each 32-bit application data transfer—SECDED (k, n), where the ECC-protected data block size, 'k', is 32 bits, ECC size, 'n', is 7 bits and codeword size n+k is 39 bits. Accordingly, in this ×16 burst example (i.e., information conveyed in 16 successive unit intervals or bit times per memory-channel link per memory transaction, with each unit interval ("ui" or "UI") commencing at a respective timing signal edge (data-strobe (DQS) or clock), control component 101 transmits (or receives) 16 distinct 7-bit ECC values per 512 bits of application data, with each 7-bit ECC value providing error detection/correction for a respective 32-bit block of the application data (and with one signaling link of the auxiliary channel unused) to effect a 39-bit codeword.

In the split-auxiliary operating mode, by contrast, ECC density is scaled from 7 ECC bits per 32-bit application data block to 8 ECC bits per 64-bit application data block (i.e., such that each ECC value corresponds to a pair of 32-bit application data transfers in successive unit intervals as shown at 147 and 149) through SECDED (72, 8) encoding/decoding, to free up half the auxiliary channel for conveyance/storage of 64 bits of metadata (or other component-level information) as shown at 150. Thus, the auxiliary channel is split evenly between ECC and metadata subchannels in this example, conveying four bits of metadata and 4 bits of ECC per unit interval (along with 32 bits of application data) and requiring two UIs to convey the entire 80-bit codeword—8-bits ECC value, 8 bits of metadata and 64 bits of application data for a total of 80 bits conveyed in successive 40-bit transfers.

In other embodiments or programmatic configurations, ECC density may be further reduced (scaled down) to support larger per-transaction metadata volumes (e.g., increasing the proportion of the auxiliary subchannel allocated to metadata conveyance/storage), and various capabilities and configurations of physical memory (DIMMs 103 in the FIG. 1 example) may bear on ECC encoder/decoder implementation and split-auxiliary-channel options. For example, the relative and absolute widths of the application data channel and auxiliary channel may change according to the number of memory channels per memory subsystem (e.g., two memory channel subsystem shown may instead be a single channel or support than two memory channels), memory device widths and quantity of memory chips per memory rank (i.e., memory rank being a set of memory ICs concurrently enabled to respond to the same memory access command by sampling our outputting data via respective subsets of signaling links within the memory channel) other than shown in FIG. 1. In those cases, ECC encoding/decoding hardware (SECDED or otherwise) may be revised/re-configured according to the available auxiliary channel bandwidth and desired per-transaction metadata volume (e.g., different SECDED encoders/decoders implemented or enabled for a memory subsystem that implements two 36-bit memory channels, each constituted by a 4-bit auxiliary channel and 32-bit data channel). Moreover, split-auxiliary operation need not be enabled for all memory channels within a given memory subsystem (e.g., one or more memory channels operated in split-auxiliary mode, one or more others in unified-auxiliary mode), nor must the proportionality of the auxiliary-channel split (i.e., between ECC and metadata) be uniform across all memory channels (e.g., different metadata densities applied within memory channels A and B), and nor must any specific set of signaling links and/or memory components be devoted to the auxiliary channel. For example, the memory control component may be configured programmatically (at production time or run time) or by design to implement the auxiliary channel via any subset of the memory-channel signaling links and corresponding memory components (i.e., other than the 8 edge-of-channel signaling links and edge-of-DIMM memory component shown in FIG. 1), with that signaling-link/memory-component subset including signaling links directed to two or more different memory components (i.e., metadata and/or ECC values conveyed over auxiliary channel may be stored within respective portions of core memory within two or more memory ICs). Additionally, though shown in FIG. 1 as being conveyed to and from control component via host PHY 115, metadata may instead be sourced in whole or part from circuitry within control component 101 and/or one or more other signaling interfaces coupled to control component 101. More generally, while per-transaction metadata is generally described herein as consisting in whole or part of component-level information associated with a host-supplied/host-requested block of application data—predetermined number of bits per application data block as needed to support Compute Express Link (CXL) or other cache-coherent interconnects, encryption or other security-related information, any other useful physical-layer, media-access-control-layer, transport-layer, application-layer data and/or any other data associated with a given memory read/write transaction (e.g., 512-bit write or read data block in the FIG. 1 embodiment and others discussed below)—metadata may additionally or alternatively include virtually any type of information useful within the memory system of FIG. 1 (or larger host system in which memory system 100 is deployed), including information lacking association with or correlation to the application data block. Also, while DIMM based memory subsystems are illustrated in FIG. 1 and referenced in embodiments discussed below, memory subsystems having various other form-factors (e.g., system on a chip, three-dimensional IC or the like) may be coupled to the split-auxiliary memory controller in all cases. Moreover, regardless of memory subsystem form factor, constituent semiconductor memory components (which may be single or multi-chip packages) may be implemented with any practicable core storage technology including, for example and without limitation, dynamic random access memory (DRAM), static random access memory (SRAM), and/or various non-volatile semiconductor storage (e.g., NAND flash, NOR flash, magnetoresistive memory, phase-change memory, etc.). Though not specifically shown, various control signaling lines may extend between control component 101 and DIMMs 103 (or other memory subsystem components) to convey command/address values, chip-enable signals, power-mode control signals, clock-enable, bus inversion, etc. In a number of embodiments, DIMMs 103 (or other form-factor memory components) may include one or more additional integrated-circuit components (register clock driver (RCD), data buffer (DB), serial presence detect (SPD), etc.) coupled to control signal lines and/or data signal lines extending from control component 101.

FIG. 2 illustrates exemplary serializer/deserializer and ECC encoder/decoder circuitry within a mode-configurable memory-side PHY. When operated in unified-auxiliary mode 161 (as shown at left in response to "config" signal setting), a 512-bit (64B) incoming application data block is serialized into a ×16 sequence of 32-bit application data words via serializer circuit 163 (i.e., converting parallel 512 data block into a continuous sequence of 16 32-bit data words). Each of the data words is supplied to a SECDED (32, 7) which, in turn, generates a 7-bit ECC value, with the ECC value and corresponding write-data word supplied in bit-parallel format via a set of 40 output drivers (shown in this case as a clocked bit register 165 and signal amplifier 167)—the 7-bit ECC value transmitted over an 8-bit auxiliary signaling channel 170 (with one output/driver signaling line unused), and the 32-bit write data word transmitted over a 32-bit data signaling channel 172 (the "application data" or "primary" channel). In embodiments herein the output drivers implement double-data-rate signaling, driving each of the sixteen 32-bit data words and 7-bit ECC values onto the memory channel (data channel+auxiliary channel) on rising and falling edges of a transmit clock signal (tclk) in respective unit intervals and thus two successive bits per signaling-link per transmit clock cycle (one bit per UI). More or fewer data transmissions per transmit clock cycle may be implemented in alternative embodiments (e.g., single bit per cycle, four bits per cycle, 8 bits per cycle, etc.), including higher data rates achieved in whole or part through transmission of multi-bit symbols per clock cycle (e.g., symbol having one of four levels to convey two bits per clock edge instead of a single bit).

Unified-auxiliary-mode read-data reception is essentially reverse of the write data transmission, with signal receivers (not specifically shown) sampling the data and auxiliary channels in response to edges of a receive clock (e.g., a clock operating at the same frequency as the transmit clock, but possibly at different phase as necessary to align receive clock edges with midpoints in incoming signal eyes) to generate a ×16 burst of 40-bit samples (one 40-bit sample per unit interval/clock edge), each 40-bit sample including a 7-bit ECC value and 32-bit data word that are jointly applied to SECDED (32, 7) decoder 175. The decoder, in response, generates a 32-bit error-detected/corrected version (RdDat) of each sampled data word (RdDat') and thus a sequence of 16 error-detected/corrected data words that are deserialized (parallelized) within 16:1 deserializer 177 to produce a 512-bit read data block to be transmitted to the host via the host PHY.

In a number of embodiments, a multi-bit implementation of the configuration signal enables various split-auxiliary modes with differentiated ECC densities according to desired per-transaction metadata volume. In the exemplary split-auxiliary configuration shown at 183 in FIG. 2 (at right), ECC density is scaled down from 7 ECC bits per 39-bit codeword to 8 ECC bits per 80-bit codeword, yielding a codeword that spans a successive pair 40-bit transfers over the auxiliary and application data signaling channels (170, 172). Accordingly, the split-aux configuration setting revises the host-side serialization factor from 1:16 to 1:8 (as shown at 185), the memory-side serialization from none to 1:2 (187) and the ECC encoder from SECDED(32, 7) to SECDED(72, 8) as shown at 189, an approach that frees auxiliary channel bandwidth (otherwise dedicated to ECC transmission) for metadata conveyance—in this case freeing half the aux-channel carrying capacity (i.e., 64 bits out of the 128 bits that may be conveyed over 8 auxiliary signaling links in a ×16 burst) for metadata transmission and storage. Moreover, the 80-bit codeword size includes headroom, after accounting for the 64-bit application data block size and 8-bit ECC value, to error-protect an additional 8 bits per codeword, and thus the entirety of any content (metadata or otherwise) conveyed over the freed portion of auxiliary channel 170. Accordingly, in the depicted embodiment, 64 metadata bits are serialized into a sequence of eight 8-bit values via serializer 191 and supplied to the SECDED(72, 8)-configured ECC encoder 189 to effect a 72-bit encoded data block that is transmitted, together with an 8-bit ECC value, via output drivers (165/167) over successive unit intervals—80-bits per UI pair and, via 1:2 serializers 193, 195 and 187, 40 bits per UI (4 bits metadata, 4 bits ECC and 32 bits application data per UI). Data received from the memory subsystem is deserialized and decoded according to the same bit ratios—2:1 deserializers (201, 203, 205) to supply an 80-bit codeword to SECDED(72,8)-configured ECC decoder 207 every two UIs (i.e., with receiver circuits (not shown) generating a 40-bit sample every UI, including 4 bits of metadata, 4 bits ECC and 32 bits of application data, and thus a complete 8-bit ECC value together with 8 bits of metadata and 64 bits application data every two unit intervals). The SECDED decoder responsively delivers a sequence of eight 72-bit error detected/corrected outputs (i.e., 8 bits of metadata and 64 bits of application data per decode) to 8:1 deserializers 209, 211 which, in turn, yield 64-bit metadata and 512-bit application data blocks with at least the latter being returned to the host via the host-side PHY.

FIG. 3 presents a logical view of application, metadata and ECC storage according to the unified- and split-auxiliary operating modes shown in FIG. 2—showing exclusively ECC storage within the auxiliary partition in unified-aux mode 181, and an evenly split allocation of that same storage in split-aux mode 183, half of the auxiliary storage to metadata and the other half to ECC. FIG. 4 illustrates various configurable (or fixed-by-hardware) ECC-density options that may be implemented by the split-auxiliary control component of FIGS. 1 and 2, showing an exemplary set of five SECDED encode/decode options within respective rows of table 220 and corresponding ×16 burst transmissions over a given memory channel (e.g., memory channel A and/or memory channel B as shown in FIG. 1) in transfer diagrams 221, 222, 223, 224, 225. In the highest ECC-density configuration, parameterized in the first row of table 220, the auxiliary channel bandwidth is split 7:1, with 7 ECC bits and 1 metadata bit transferred per unit interval (as shown in transfer diagram 221), thus enabling conveyance and storage of 16 metadata bits per memory access transaction. Thus, the ECC encoder/decoder set implements SECDED (33, 7), with each 40-bit codeword constituted by 32 application data bits ("32 dat"), one metadata bit ("1 md"), and seven ECC bits ("7 ECC") as shown in the second column of table 220. The total auxiliary channel transfer over the 16-UI burst interval (8 transmit clock cycles in a double-data-rate output driver implementation) includes 16 metadata bits and 112 ECC bits (512 application data bits are transferred in all cases), with a single UI per codeword. In an embodiment capable of data-rate ECC encoding/decoding (i.e., executing an ECC encoding/decoding operation within a single unit interval), the serialization may be effected by a 1:16 host-side encoder as shown in the "serialization split" column of table 220. For data reception, the deserialization placement and ratios remain the same—SECDED(32,7) decoder feeding a 16:1 host-side deserializer.

Continuing with FIG. 4, the second row of table 220 corresponds to the SECDED(72,8) configuration shown in the split-aux mode of FIG. 2, increasing the per-codeword ECC bit depth by one bit (from seven bits to eight). As shown in the exemplary data transfer diagram at 222, every codeword spans two UIs and includes 64 bits of application data (231), 8-bits of metadata (232) and 8-bits of ECC (233). The per-codeword ECC bit depth is incremented by another bit in the third row of table 220 (from 8 bits to 9), with total ECC density further reduced by extending the codeword over four unit intervals as shown in transfer diagram 223. Thus, per columns 1-3 of table 220, SECDED(151, 9) encoding/decoding is implemented to enable a codeword consisting of 128 application data bits (i.e., 32-bits per UI over 4 UIs), 23 metadata bits and 8 ECC bits—effecting a total auxiliary channel transfer/storage of 92 metadata bits and 36 ECC bits per memory access transaction. As can be seen in transfer diagram 223, the per-codeword metadata and ECC bit counts (23 and 9, respectively) are not uniformly divisible over the four UI interval codeword transfer so that the metadata bit count per UI (and ECC bit count per UI) is not uniform across the four-UI codeword transfer interval. While a specific bit pattern is shown (one additional ECC bit conveyed in final UI of 4-UI codeword transfer), ECC and metadata bits may be conveyed in any practicable distribution within the available auxiliary channel bandwidth (including transfers consisting of metadata exclusively or ECC bits exclusively)—an option in all ECC bit-depth configurations herein, regardless of whether the auxiliary bandwidth may be split uniformly across UIs or groups of UIs or not. For example, in the SECDED (72,8) configuration, 8-bits of metadata may be transmitted via the auxiliary channel in one unit interval followed (or preceded) by transmission of a corresponding set of 8-bits of ECC information in a succeeding or preceding unit interval—an arrangement that may provide serialization/deserialization benefits in some implementations.

Still referring to FIG. 4, the fourth and fifth rows of table 220 show progressively reduced ECC density, with the codeword extending to 320 bits (8 unit intervals, 10-bit ECC value) in the former instance (fourth row of table 220) and to the full 640 bits of the 16-UI transfer in the latter instance (11-bit ECC value). As in the SECDED(151, 9) embodiment, the per codeword metadata/ECC bit counts do not enable uniform metadata/ECC-bit split across all UIs (or exclusive information load within all UIs—i.e., as where each UI may convey exclusively metadata or exclusively ECC), with exemplary metadata/ECC patterns shown in transfer diagrams 224, 225. Any other practicable distribution of ECC and metadata within the auxiliary channel and/or across UIs may be implemented.

FIG. 5 illustrates applicability of the various ECC bit depths shown within table 220 of FIG. 4 (the first two columns of which are excerpted at 250) across different multi-channel DIMM implementations, including a DIMM 251 containing ten ×4 memory ICs per memory channel on each face (i.e., each memory IC having a four-bit data width to effect a 40-bit memory channel), as well as a DIMM 253 having five ×8 memory ICs per memory channel on each face, also effecting a 40-bit memory channel. As discussed above, various memory form factors other than dual inline memory modules may be deployed in connection with a split-aux memory control component in alternative embodiments, and DIMMs having more or fewer than two memory channels may be used.

FIG. 6 illustrates exemplary application of a split-auxiliary channel in an alternative DIMM implementation (261) having two 36-bit memory channels (e.g., nine ×4 memory ICs per memory channel on each DIMM face, with each memory IC coupled to a respective set of four signaling links within the 36-link signaling path). In this example, the primary data channel width (application data channel width) is maintained at 32 bits (32 signaling links), while the auxiliary channel width is halved from eight links to four links (8 bits to 4 bits in the case of binary symbol conveyance). As shown, ECC bit depth may be scaled as shown in table 270 and corresponding transfer diagrams (271, 272, 273) to enable desired per-transaction metadata volume. In the 9-bit ECC bit depth shown in the first row of table 270, for example, SECDED(135, 9) ECC encoder/decoder circuitry generates a 144 bit codeword (135+9) that is transmitted over the 36-bit memory channel in four successive unit intervals, with four such codewords transmitted per ×16 burst. Each codeword conveys 7 bits of metadata (and 128 bits of application data), so that as many as 28 metadata bits may be conveyed to the memory subsystem (and stored therein) per memory transaction together with 512 bits of application data. As one codeword is generated per four unit intervals, 1:4 host-side serialization is implemented (e.g., as shown in the final column of table 270) to supply 135 bits (128 application data bits and 7 metadata bits) to a SECDED (135, 9) encoder, with the output of that encoder being further serialized 1:4 for transmission to the memory subsystem in four consecutive unit intervals (16 UIs used to convey all four codewords). The latter two rows of table 270 show additional ECC bit depth configurations (10 bits and 11 bits, respectively) with corresponding codeword content and host-side/memory-side serialization ratios. As in a number of ECC bit-depth configurations discussed above, the per codeword metadata/ECC bit counts for the three ECC-density configurations shown in table 270 do not enable uniform metadata/ECC-bit split across all UIs, with exemplary metadata/ECC patterns shown in transfer diagrams 271, 272, 273. Any other practicable distribution of ECC and metadata within the 4-bit auxiliary channel and/or across UIs may be implemented in alternative embodiments.

In embodiments described thus far, SECDED encoder/decoder circuits are clocked at frequencies according to the data rate divided by the unit-intervals per codeword and thus at the data rate in the highest-frequency case (first row of FIG. 4 table 220), half the data rate (same frequency as the transmit/receive clock—collectively the “memory” clock rate—in the double-data-rate examples presented) in the SECDED(72, 8) example shown in the second row of table 220, or half, one-quarter or one-eighth the memory clock rate, respectively, in the final three rows of the FIG. 4 table (and the three rows of table 270 in FIG. 6). In alternative embodiments, configuration-dependent ECC decode/encode clocking is avoided by clocking the SECDED encoder/decoder circuits with a fixed-rate controller core clock or frequency-divided instance of the core clock in all ECC-density configurations with (i) the core clock having a predetermined frequency relation to the memory clock and (ii) accommodation of ECC-density-dependent UI-count per encode/decode within the encoder/decoder circuit implementations themselves. More specifically, where the configuration-required rate of ECC encode (or decode) exceeds the core clock rate (e.g., configuration requires an ECC encode every two unit intervals (2UI) where core clock cycle time is 4UI), multiple instances of the ECC encode/decode circuits may be operated in parallel to meet the encoding/decoding demand.

FIGS. 7 and 8 illustrate examples of ECC circuit parallelization for the 2UI per ECC codeword example shown in FIG. 4 table row two (e.g., SECDED(72,8)), with the parallel (multi-instance) ECC encoders/decoders clocked by half-rate core clock and quarter-rate core clocks, respectively. Taking the FIG. 7 example first, the controller core clock (clk-c) cycles at half the rate of the memory clock (clk-m) and thus once for every four unit intervals in a double-data-rate memory-side PHY (i.e., $t_{clk-c}=2t_{clk-m}=4UI$). To meet the ECC encode/decode rate demanded by the SECDED(72, 8) configuration—one ECC encode per 2UI in the write data path, one ECC decode per 2UI in read data path—two SECDED(72,8) ECC encoder instances (189) operate in parallel in the core clock domain to encode respective halves of the 128 bit application data blocks and 16 bit metadata chunks exiting 1:4 serializers 301 and 303, respectively. That is, each SECDED (72, 8) encoder 189 receives a respective half (64 bits) of each 128-bit application data block and a respective half (8 bits) of each 16-bit metadata chunk and produces a respective 8-bit ECC value, with the two 8-bit ECC values (16 bits of ECC information total) being supplied, together with the source 128-bit application data block and 16-bit metadata chunk, to 1:4 serializers 305, 307, 309 within the memory clock domain to produce the requisite 32-bit application data word, 4-bit metadata value and 4-bits of ECC information transmitted per unit interval. The memory read path is the converse of the write path, with the outputs of 4:1 deserializers 321, 323, 325 (i.e., 128 bits application data, 16 bits metadata, 16 bits ECC) split evenly between two core-clocked SECDED(72, 8) decoders 207, with each decoder yielding an error-detected/corrected set 8 metadata bits and 64 application data bits—collectively 16 metadata bits and 128 application data bits that are 4:1 deserialized within host-side deserializing circuits 331, 333 to yield a 64-bit metadata block and 512-bit application data block as shown. FIG. 8 illustrates a similar approach in the context of a quarter-rate core clock signal (i.e., $t_{clk-c}=4_{clk-m}=8UI$), with four SECDED encoder/decoder instances operated in parallel to encode and decode the requisite volumes of application data and metadata—that is, 256 application data bits and 32 metadata bits supplied in respective 64-bit/8-bit subsets to each of four SECDED(72, 8) encoders and correspondingly generated by each of four SECDED(72, 8) decoders.

FIG. 9 presents a tabulated view of various configuration operations that may be selected/enabled to yield half-rate core clock and quarter-rate core clock ECC encoding/decoding for selected ECC bit depths (ranging from 7 bits to 11 bits in this SECDED example) and across the two exemplary module memory populations presented above (i.e., 40-bit memory channel, 36-bit memory channel). Where a fractional number of encode/decode operations are required per core clock cycle (e.g., “½” or “¼” as shown in column 7 of FIG. 9), a single encoder may be operated in pipelined manner (or in response to frequency-divided core clock signals, etc.) to encode/decode a given SECDED codeword over multiple core clock cycles (e.g., over two or four core clock cycles where the encode/decode per core clock cycle is ½ or ¼, respectively). Alternatively, fractional encode/decode per core clock cycle may be accommodated by operating the encoder/decoder at the core clock rate, idling for one or more cycles after each encode/decode to yield the fractional encode/decode rate.

FIG. 10 illustrates an embodiment of a memory control component having a configuration register 351 that may be run-time programmed (e.g., in response to host instruction/operand) or production-time programmed to enable operation in either of the unified-auxiliary or split-auxiliary modes presented herein (e.g., setting “sa” bit to ‘0’ or ‘1’) and, when split-aux mode is enabled, to operate with an ECC density that yields a desired metadata subchannel bandwidth/storage capacity within an otherwise ECC-dedicated auxiliary channel. In the conceptual example depicted, the ECC density setting and split-aux enable bit (‘sa’) are supplied to a configuration decoder 353 that responsively outputs configuration signals to set the host-side and memory-side serialization/deserialization ratios ($HS_{SEL}$ and $MS_{SEL}$, respectively, supplied to host-side serializer 355 and memory-side serializer 357) and ECC encoding density within variable-density encoder 359 in accordance with the programmed setting. Though not specifically shown, the same control signals are applied to host-side and memory-side deserializers and variable-density ECC decoder (not specifically shown) in the read data path. In the FIG. 10 embodiment, variable-density ECC encoder 359 (and counterpart decoder) includes SECDED encode blocks corresponding to each of the options shown in FIG. 9 for a 40-bit memory channel or a 36-bit memory channel, with the ECC-select signal enabling one of those SECDED encoders (any of which may include multiple encoder instances according to the core-clock/memory-clock ratio per discussion of FIGS. 7, 8 and 9) and disabling the others. Though not specifically shown, configuration decoder 353 may additionally output a configuration signal to I/O block 361 to disable unused output drivers/receivers in response to an ECC density corresponding to a 36-bit memory channel. In alternative embodiments, circuitry within any one of the constituent SECDED encoders within variable-density ECC encoder 359 may also constitute part or all of the circuitry within another of the constituent encoders (i.e., sharing circuitry so that implementations of the constituent decoders need not be discrete). Likewise, for SECDED decoder instances (not shown) in the read data path. More generally, various encoders other than (or in addition to) the specific SECDED encoders shown may also be selectively engaged within variable-density ECC encoder 359, including encoders corresponding to memory channel widths other than the 40-bit and 36-bit widths shown in FIG. 9, block encoders other than or in addition to SECDED encoders, and so forth.

Referring to FIGS. 1-10 generally, while application data, metadata and ECC values are presented in various specific ratios herein (e.g., application data constituted by $2^N$ bits, metadata constituted by M bits, where $2^N$+M yields a non-power of number of bits, and/or where $2^N \geq 8$*M; '*' denoting multiplication) such ratios are presented for purposes of explaining exemplary operation within selected embodiments. Various other ratios application data, metadata and/or ECC information may apply in alternative embodiments. Also, the various memory control components presented herein may be implemented within a stand-alone integrated circuit component or IC package, or within one or more IC components (including packages having multiple IC dies) that combines the memory control function with one or more other functions (e.g., integrated-circuit processor, application-specific integrated circuit (ASIC), etc.). One or more programmed microcontrollers and/or dedicated hardware circuits (e.g., finite state machines, registered or combinational circuits, etc.) may implement and/or control all or part of the various architectural and functional elements within the memory controller architectures presented herein (e.g., to implement any one or more of the ECC decoders, encoders, configuration controller, etc.). Additionally, any or all of those architectural/functional elements may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the various memory channel widths, memory-IC data widths, per-DIMM device counts, signaling path widths, data block sizes, data word sizes, message lengths, encoding/decoding schemes and parameters, host interface types, data-unit or symbol sizes (e.g., nibbles, bytes), metadata sizes, error detection/correction capabilities, ECC density options, and so forth are provided for purposes of example only—any practicable alternatives may be implemented in all cases. Similarly, signaling link parameters, protocols, configurations may be implemented in accordance with any practicable open or proprietary standard and any version of such standard. Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A memory control integrated circuit (IC) comprising:

a signaling interface having signal transmitters to be coupled via respective signaling links to a memory IC;

a programmable register to store a first control value that, when set to a first state, enables transmission of constituent bits of a metadata value to the memory IC via one or more of the signal transmitters and that, when set to a second state, disables transmission of the constituent bits of the metadata value to the memory IC via the one or more of the signal transmitters, wherein the programmable register includes a field to store a second control value that specifies one of a plurality of error correction code (ECC) densities;

ECC circuitry to generate an error correction code constituted by a first quantity of ECC bits if the second control value specifies a first BCC density, and to generate an error correction code constituted by a second quantity of ECC bits, greater than the first quantity, if the second control value specifies a second ECC density; and a first configurable serialization circuit to convert, response to specification of the first ECC density by the second control value, a block of N application data bits into a serial application data stream that consists of M sequential instances of N/M application data bits, N and M being nonzero integers and '/' denoting division, each of the M sequential instances of N/M application data bits being applied within the ECC circuitry to generate a respective instance of the error correction code constituted by the first quantity of ECC bits.

2. The memory control IC of claim 1 wherein the first control value, when set to the second state, enables transmission of constituent bits of an error correction code to the memory IC via the one or more of the signal transmitters and, when set to the first state, disables transmission of the constituent bits of the error correction code to the memory IC via the one or more of the signal transmitters.

3. The memory control IC of claim 1 wherein the first configurable serialization circuit comprises circuitry to convert, in response to specification of the second ECC density by the second control value, the block of N application data bits into a serial application data stream that consists of K sequential instances of N/K application data bits, K being an integer less than M, each of the K sequential instances of N/K application data bits being applied within the ECC circuitry to generate a respective instance of the error correction code constituted by the second quantity of ECC bits.

4. The memory control IC of claim 3 further comprising a second configurable control circuitry that converts each of the M sequential instances of N/M application data bits into J sequential instances of N/(M*J) application data bits if the second control value specifies the first ECC density and that converts each of the K sequential instances of N/K application data bits into J sequential instances of N/(K*L) application data bits if the second control value specifies the first ECC density, where M*J is equal to K*L.

5. The memory control IC of claim 1 wherein the ECC circuitry to generate the error correction code comprises single-error-correction, double-error-detection (SECDED) error correction code circuitry.

6. The memory control IC of claim 1 further comprising circuitry to transmit one or more values to memory IC indicative of respective states of the first and second control values stored within the programmable register.

7. The memory control IC of claim 1 further comprising circuitry to enable transmission of one or more constituent bits of the metadata value and one or more constituent bits of an error correction code via a single one of the signal transmitters at respective times as part of a memory write transaction if the first control value is stored within the programmable register in the first state.

8. A method of operation within a memory control integrated circuit (IC), the method comprising:

storing a first control value in either a first state or a second state within a programmable register of the memory control IC;

enabling transmission of constituent bits of a metadata value to an external memory component via one or more signal transmitters of the memory control IC in response to storage of the first control within the programmable register in the first state; and disabling transmission of constituent bits of the metadata value to the external memory component via the one or more signal transmitters in response to storage of the first control within the programmable register in the second state;

storing, within the programmable register, a second control value that specifies one of a plurality of error correction code (ECC) densities;

generating an error correction code constituted by a first quantity of ECC bits if the second control value specifies a first ECC density, generating an error correction code constituted by a second quantity of ECC bits, er Bater than the first quantity, if the second control value specifies a second ECC density; and converting, in response to specification of the first ECC density by the second control value, a block of N application data bits into a serial application data stream that consists of M sequential instances of N/M application data bits, N and M being nonzero integers and '/' denoting division, each of the M sequential instances of N/M application data bits being applied to generate a respective instance of the error correction code constituted by the first quantity of ECC bits.

9. The method of claim 8 further comprising:

disabling transmission of constituent bits of an error correction code to the external memory component via the one or more signal transmitters in response to storage of the first control within the programmable register in the first state; and enabling transmission of constituent bits of the error correction code to the external memory component via the one or more signal transmitters in response to storage of the first control within the programmable register in the second state.

10. The method of claim 8 further comprising converting, in response to specification of the second ECC density by the second control value, the block of N application data bits into a serial application data stream that consists of K sequential instances of N/K application data bits, K being an integer less than M, each of the K sequential instances of N/K application data bits being applied to generate a respective instance of the error correction code constituted by the second quantity of ECC bits.

11. The method of claim 10 further comprising converting each of the M sequential instances of N/M application data bits into J sequential instances of N/(M*J) application data bits if the second control value specifies the first ECC density, and converting each of the K sequential instances of N/K application data bits into J sequential instances of N/(K*L) application data bits if the second control value specifies the first ECC density, where M*J is equal to K*L.

12. The method of claim 8 wherein the generating the error correction code comprises generating a single-error-correction, double-error-detection (SECDED) error correction code.

13. The method of claim 8 further comprising transmitting one or more values to the external memory component indicative of respective states of the first and second control values stored within the programmable register.

14. The method of claim 8 further comprising enabling transmission of one or more constituent bits of the metadata value and one or more constituent bits of an error correction code via a single one of the signal transmitters at respective times in response to storage of the first control within the programmable register in the first state.

* * * * *